Dec. 29, 1964  K. ENGELS  3,163,403
MIXING MACHINE
Filed Jan. 13, 1961  2 Sheets-Sheet 1

Inventor:
KASPAR ENGELS
BY Robert H. Jacob
AGT.

Dec. 29, 1964   K. ENGELS   3,163,403
MIXING MACHINE
Filed Jan. 13, 1961   2 Sheets-Sheet 2

Inventor:
KASPAR ENGELS
BY Robert K. Jacob.
AGT.

United States Patent Office
3,163,403
Patented Dec. 29, 1964

3,163,403
MIXING MACHINE
Kaspar Engels, Mannheim-Waldhof, Germany, assignor to Draiswerke G.m.b.H., Mannheim-Waldhof, Germany
Filed Jan. 13, 1961, Ser. No. 82,443
Claims priority, application Germany, Jan. 16, 1960, D 32,359; Dec. 8, 1960, D 34,898
10 Claims. (Cl. 259—9)

The invention relates to mixing machines of the type having a stationary drum and is more particularly concerned with a continuously operating mixing machine for mixing different types of substances, but is primarily for use in cases where one of the mixing components is constituted of materials in the form of fine dust particles. Mixing machines are known for this purpose which comprise a mixing drum having a material supply device at one end and a material discharge device at the other end. In mixing machines of this type the mixing shaft with the appertaining mixing tools is journalled at the drum, and the mixing shaft is provided with driving means.

It is an object of the invention to provide a mixing machine constructed and operative in such a manner that independently of the materials being mixed and within satisfactory limits, and also independently of fluctuations in the volume handled by the machine, completely even mixing of the substances fed into the machine is attained up to minutest fineness, and even then when it is necessary to mix into the material the most easily flying components. All of this is to be achieved in a mixing machine that can be operated continuously.

Accordingly the invention provides for operation of the mixing shaft at such speed of rotation that a ring of material is formed along the inner wall of the drum and that the material intake and the material discharge apertures are provided at the end walls of the drum and in such a manner that these apertures are disposed inside the circular area that is encompassed by the ring of material.

Known machines of the prior art involve the shortcoming that they have a tangential material intake at the feed end and tangential material output at the discharge end. This condition interferes with the forming of the material ring on the inner surface of the mixing drum which is intentionally endeavored in accordance with the invention.

On the other hand, it cannot be avoided in the operation of the known machines that an air or gas filled or at least a gas enriched space is formed in the direction of the mixing shaft in which a considerable air whirling effect is developed which, however, does not prevent that, for example, with additives of very readily dust forming consistency a passing through velocity of these floating powdered components, which are carried along by the air, is developed in this inner space which differs from the general mixing time for the other materials involved. As a result the heavy mixing load sought in high velocity machines in accordance with the invention is lacking. The component which is to be admixed to the other material leaves at the discharge end as a free superimposed material flow.

Since in accordance with the invention the material feed aperture and the material discharge aperture are disposed at the end walls of the mixing drum in such a manner that these apertures are located within the circular area which is surrounded by the ring of material, it follows that the desired formation of the ring of material takes place to the utmost extent without disturbink effects and that the mixing tools of the high velocity mixing shaft exert the great mixing effect in the area of this material ring, which is of decisive significance for the high quality mixed product sought to be obtained.

An essential accomplishment in accordance with the invention is the cognition that the mixing machine of the type described is not only suitable for the continuous mixing of substances of all kinds but, in addition, provides a particularly great advantage over the prior art machines when it is used for the continuous preparation or treatment of thermoplastics and duroplastics. In that case the raw materials for the plastics are supplied to the mixing drum with the dyes, fillers, stabilizers, softeners, lubricators and the like.

By using the machine in accordance with the invention for the preparation of thermoplastics and duroplastics the continuous preparation and treatment of these substances in a single working operation becomes possible for the first time. The high speed of the mixing shaft for the formation of the material ring in the mixing drum causes that in the material ring formed by the raw materials of the plastic and in the additives such frictional heat is developed that the required mixing and jelling, as well as granulation, if any, of the materials supplied to the mixing drum takes place in the mixing drum, and this without any application of pressure to the individual mixture components. The fact that this continuous working operation takes place without the application of pressure has a particularly favorable effect on the products made subsequently from the thermoplastics and duroplastics. An essential advantage of the invention resides also in the fact that this continuous treatment operation takes place substantially more rapidly than it was possible to perform heretofore with the known machines for the preparation and treatment of the plastics raw materials. The continuous preparation of plastics raw materials achieved for the first time provides also for an essential decrease in labor.

In accordance with the invention it is also possible to add to the mixing and heating zone of the mixing drum for the preparation of the plastic raw materials in a unitary structure and in axial direction a drum section serving for the cooling operation.

In the case where the machine in accordance with the invention is used as an ordinary mixing machine or as a machine for the preparation of plastic raw materials, a further feature of the invention is of great significance in accordance with which one or more closed disks rotating with the mixing shaft are provided, which are made of such size that they dip into the ring of material which is formed during the mixing or friction operation. This results in an interruption of the uncontrolled passage of light or possibly floating powder components in the open interior of the ring of material. Also the admixture components which have a tendency to float are forced by these disks to enter the ring of material. Accordingly also these components are compelled to participate in the mixing operation. The high mixing intensity brings the mixture components so closely together that partially the surface forces cause mixture adherence in such a manner that, depending on the product, some welding may take place.

Further details of the invention will become apparent if reference is had to the accompanying drawings which illustrate an embodiment of a mixing machine for the continuous combined preparation of thermoplastics or duraplastics and in which.

Figure 1:
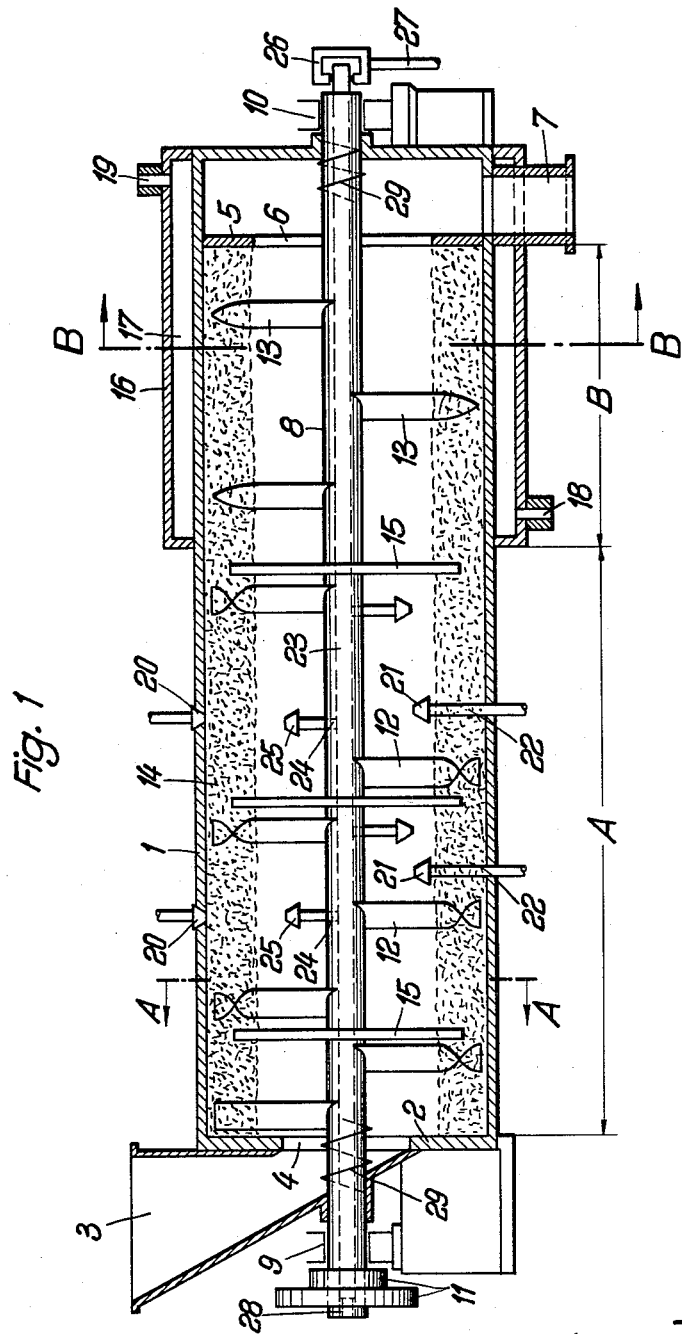
FIG. 1 shows a mixing machine in longitudinal cross section.

The mixing machine comprises a drum 1 having at the supply or intake end an end wall 2 provided with a funnel 3. The wall 2 is formed as an annular disk having a circular aperture 4 in a manner that the raw materials of the plastic which are fed into the funnel 3 reach the interior of drum 1 by way of the circular aperture 4. An annular disk 5 is also provided at the discharge end of the cooling drum. The material issuing from the mixing drum must pass through the aperture 6 of this annular disk 5 in order to leave the mixing drum through the discharge duct 7.

A mixing shaft 8 is provided in the mixing drum 1 which is supported in the bearings 9 and 10 and which is driven by way of the coupling device 11. The mixing shaft 8 is equipped with mixing tools 12 and 13.

The shaft 8 of the mixing machine is driven at such a speed of rotation that the centrifugal force produced thereby causes the raw materials of the plastic fed into the drum to be cast against the inner wall of the mixing drum 1 in a manner that a ring of material 14 is formed therein. The mixing shaft 8 is provided with additional disks 15 mounted at an axial distance from one another, the diameter of which is so chosen that the outer rim of these disks 15 projects into the ring of material 14. This means that all mixture components fed into the mixing drum must pass through the gap of the ring between the inner wall of the drum 1 and the outer rim of the disks 15 through the ring of material formed in the drum.

The mixing drum comprises the sections A and B. The drum section A serves for mixing and heating the raw materials of the plastic, in which connection it is possible by the choice of the suitable number of revolutions of the mixing shaft in combination with the volume passed through the drum and the construction of the mixing arms to carry the heating so far that such a temperature develops which insures the desired jelling and softening of the raw materials of the plastic without application of pressure.

In the type of mixing machine illustrated the drum section A is joined directly to a drum section B, which is defined in an axial extension of the drum and which serves for cooling the material that has been mixed and heated in section A. For this purpose the mantle of the drum 1 is provided with an outer mantle 16 in the region of section B. A suitable cooling agent may be conducted through the annular space 17 by way of the hollow stubs 18 and 19. For the support of the cooling operation the mixing shaft 8 is provided with a smaller number of mixing arms 13 in the region of the drum section B. As indicated schematically in the drawing, the shape of these mixing arms 13 in the cooling area B is different than in the drum region A in a manner that they may, for example, be pointed so as to produce only as little frictional heat as possible.

The cooling effect in the drum section B may also be caused or supported by subdividing the mixing shaft for the drum section A and the drum section B so that each of the two mixing shafts may be provided with different driving means, in such a manner that the mixing shaft for the cooling section B is driven at a smaller number of revolutions than the mixing shaft of the drum section A.

In accordance with the invention it is also essential for the efficient preparation of thermoplastics in what manner the introduction of the required softening agent to the other raw materials for the plastics is effected.

In accordance with the invention it is considered preferable that the introduction of the softening agent into the material being treated in the drum takes place only at a particular distance from the supply aperture of the mixing drum. This insures a corresponding mixing of the powdered components, and a medium temperature of the material being mixed is already attained which causes rapid penetration of the softener into the plastic materials.

It has furthermore been found to be of value in accordance with the invention that the required quantity of the softening component is not introduced suddenly in one place to the material being mixed in the drum, but it is particularly valuable for the control of the Dry-Blend-Method which is to be carried out that several entrance apertures for the softener are arranged in sequence axially of the drum. Under some conditions it is even desirable particularly for the sensitive PVC emulsions to extend the introduction of the softener through suitable distribution of the supply apertures even into the cooling zone.

The supply of the softener can be effected by means of injection nozzles 20 which are provided on the mantle of the drum 1, by means of which the softening agent is forced into the ring of material under suitable pressure. The softening agent can be introduced in the mix at a relatively low pressure, if the injection nozzles 21 are provided at the free end of supply ducts 22 in the interior of the drum in such a manner that these supply ducts 22 extend through the ring of material 14.

In many cases it is particularly advantageous for the introduction of the softening agent to provide the mixing shaft 8 with an axial bore 23 and with suitable radial bores 24. The radial bores 24 must then be provided with nozzles 25. At the right end of the mixing shaft 8 a feed cap 26 is arranged which is provided with a tubular supply stub 27 for the softening agent. At the left end of the mixing shaft 8 the axial bore 23 is closed by the plug 28.

The softening agent supplied in cool condition by way of the stub 27 to the bore 23 of the mixing shaft 8 first has a cooling effect on the material being treated in the region of the cooling section B. In the region of the zone A of the drum the softener is already in the desired condition, so that there the supply of a warmed softening agent to the raw materials being treated will take place at the most advantageous locations of the drum.

In accordance with the invention the mixing machine may be used for carrying out the Dry-Blend-Method where the prepared thermoplastic or duroplastic leaves the mixing machine in pulverized or granulated form. Instead of the Dry-Blend-Method it is fundamentally also possible with the same machine by suitably greater heating inside the heating zone A to discharge the treated material from the mixing drum in a more or less plastic condition, so that this plastic material may be directly supplied in the form of lumps or cakes to a calendar for producing plastic sheets as the particular method may require. In this case the mixing drum is operated without a cooling area B. In accordance with the invention it is also possible in the production of the plastic product to carry out a continuous method of operation. For this purpose it is recommended to suitably adapt the mixing tools of the mixing shaft at the discharge end of the drum to the particular conditions of the plastic material which prevail in that area.

The mixing shaft 8 is provided with a feed back thread 29 in the region of the supply tunnel 3 and at the discharge end of the mixing drum.

Figure 2:
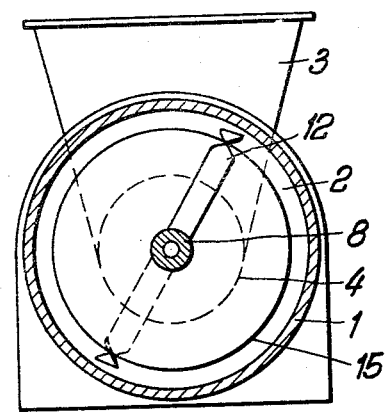
FIG. 2 is a section taken along line A—A in FIG. 1.

The cross sectional illustration in accordance with FIG. 2 shows the mixing drum 1 having an intake end wall 2 and a supply funnel 3. The intake aperture 4 in this case is indicated in dashes as a circular aperture. Two mixing arms 12 are shown on the mixing shaft 8 of FIG. 2 which are displaced by 180°. Advantageously all mixing arms of this system are displaced by 180°. However, other angular relationships can be employed, above all, a helical arrangement which, depending upon the orientation, will promote or impede the passage of the material.

Figure 3:
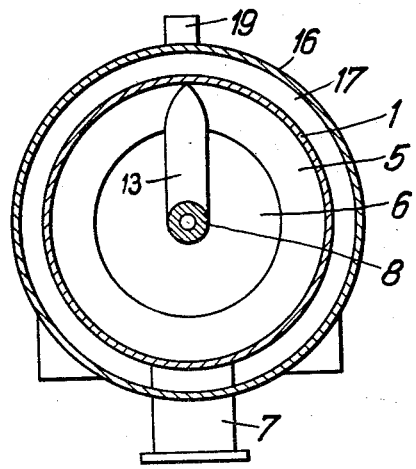
FIG. 3 is a section taken along line B—B in FIG. 1 having a rigid discharge opening.

In FIG. 3 the mixing drum is illustrated again showing the stop ring 5 as well as the discharge duct 7. In accordance with FIG. 3 the stop ring 5 is provided with a circular discharge aperture 6. The stop ring 5 is mounted on the drum in a manner to be readily exchangeable so that other stop rings having different sizes of discharge apertures can be inserted. In this manner different volumes of material can be fed into the drum to obtain different mixing times for the material, while the volume remains the same, or it is also possible to adapt the volume to different output quantities. A mixing arm 13 is mounted on shaft 8. A double mantle 16 is provided so that a cooling agent may be fed into the annular space 17. Depending on the use of the mixing machine the double mantle may also be provided in the region of drum section A so that a coolant or heating agent may be introduced there.

Figure 4:
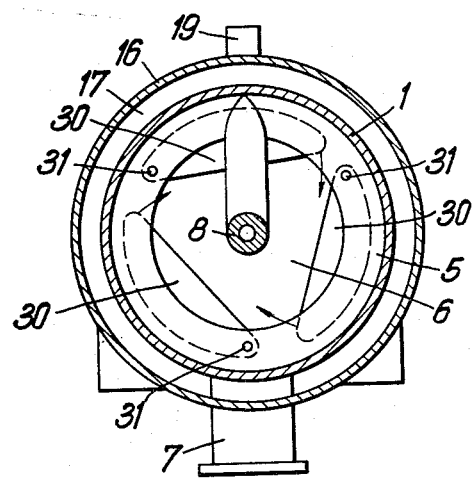
FIG. 4 is an embodiment slightly differing from that shown in FIG. 3 including inserts which may be adjusted during operation to change the magnitude of the discharge opening.

FIG. 4 shows a very similar arrangement as FIG. 3, but means are provided there to enable adjustment of the discharge aperture during operation by way of adjustment of the cross sectional area of discharge. For this purpose stop ring 5 is provided with segments 30 which can be pivotally moved about pins 31 so that the apertures 6 may be increased or decreased in cross sectional area. For the sake of clearness only three pivotable segments are indicated. It is, however, possible to provide such a number of segments as may be necessary that on moving the segments into the area of the discharge aperture, they approximate a circular area. A control arrangement of the type used in connection with photographic cameras may be utilized. In order to obtain different shapes of discharge apertures it is also possible to use other known arrangements, for example, several radially adjustable segments.

In the embodiments in accordance with FIGS. 1 to 4 the material intake aperture and the material discharge aperture are of circular form, and they are concentric with the mixing shaft. The material intake aperture 4 is smaller than the material discharge aperture, and in particular the discharge aperture 4 is also smaller than the inner circular area that is left open by the ring of material. The mixing arms or mixing tools sweep with their ends only 40 to 70% of the length of the mixing drum. The bore 23 of the mixing shaft 8 may also be used for introducing other substances to be added to the mix, depending on the use of the mixing machine.

Figure 5:
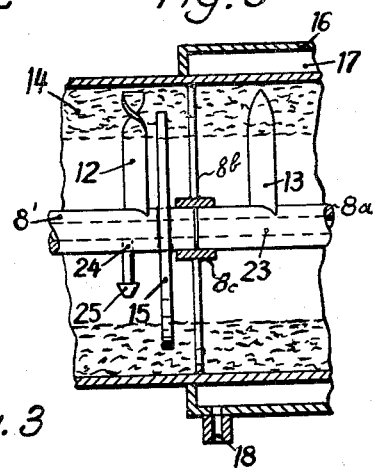
FIG. 5 is a partial sectional view illustrating the feature of the shaft being made in two sections.

The feature mentioned hereinabove of the shaft 8 being subdivided is shown in greater detail in FIG. 5. The ends of the two shafts 8' and 8a are journaled in the bearing 8c which is supported by stationary struts or bars 8d which permits rotation of the shafts 8' and 8a at different angular velocities. Also in this embodiment of the invention a passage 23 may be provided for feeding an additive to nozzles such as 25 by way of aperture 24.

The heating, the agglomeration or the jelling and the plastifying of the raw materials, if need be, until a complete cake or the like is formed, require only very short operating periods when the machine in accordance with the invention is used. The operations can be completed in 30 seconds and rarely require than 120 seconds.

Having now described my invention with reference to the embodiments illustrated in the drawings, I do not wish to be limited thereto, but what I desire to protect by Letters Patent of the United States is set forth in the appended claims.

I claim:

1. Mixing machine for the continuous mixing of different materials, primarily powdered substances, comprising a mixing drum extending substantially horizontally and having a rectilinear profile internally presenting a generally smooth, continuous peripheral surface, material receiving means at one end wall of said drum including means defining an intake aperture, material output means at the other end wall of said drum including means defining a discharge aperture and a substantially horizontal mixing shaft extending through said drum and having a driving means, said shaft including stirring arms extending at different positions longitudinally of said shaft and radially therefrom into proximity of said peripheral surface operative to impart centrifugal force to material in said drum to form a ring of material circumferentially of the inner wall of said drum and at least one disk rotatable with said shaft and projecting therefrom into said ring of material during mixing operations and defining a passage between the circumference thereof and said peripheral surface, said intake and said discharge apertures being disposed within the confines of the circular area encompassed by said ring of material, said end walls being substantially ring shaped and thus retaining the main part of said material near the circumference of said drum.

2. Mixing machine for the continuous mixing of different materials, primarily powdered substances, comprising a mixing drum extending substantially horizontally and having a rectilinear profile internally presenting a generally smooth, continuous peripheral surface, material receiving means at one end wall of said drum including means defining an intake aperture, material output means at the other end wall of said drum including means defining a discharge aperture and a substantially horizontal mixing shaft extending through said drum and having a driving means, said shaft including stirring arms extending at different positions longitudinally of said shaft and radially therefrom into proximity of said peripheral surface operative to impart centrifugal force to material in said drum to form a ring of material circumferentially of the inner wall of said drum and at least one disk rotatable with said shaft and projecting therefrom into said ring of material during mixing operations and defining a passage between the circumference thereof and said peripheral surface, said intake and said discharge apertures being disposed within the confines of the circular area encompassed by said ring of material, said end walls being substantially ring shaped and thus retaining the main part of said material near the circumference of said drum, and a plurality of injection apertures arranged inside said drum and spaced from said intake aperture for supplying an additive agent such as a softener to the material in said drum.

3. Mixing machine for the continuous mixing of different materials, primarily powdered substances, comprising a mixing drum extending substantially horizontally and having a rectilinear profile internally presenting a generally smooth, continuous peripheral surface, material receiving means at one end wall of said drum including means defining an intake aperture, material output means at the other end wall of said drum including means defining a discharge aperture and a substantially horizontal mixing shaft extending through said drum and having a driving means, said shaft including stirring arms extending at different positions longitudinally of said shaft and radially therefrom into proximity of said peripheral surface operative to impart centrifugal force to material in said drum to form a ring of material circumferentially of the inner wall of said drum and at least one disk rotatable with said shaft and projecting therefrom into said ring of material during mixing operations and defining a passage between the circumference thereof and said peripheral surface, said intake and said discharge apertures being disposed within the confines of the circular area encompassed by said ring of material, said end walls being substantially ring shaped and thus retaining the main part of said material near the circumference of said drum, and a plurality of injection apertures arranged inside said drum and spaced from said intake aperture for supplying an additive agent such as a softener to the material in said drum, said injection apertures being arranged axially of said drum.

4. Mixing machine for the continuous mixing of different materials, primarily powdered substances, comprising a mixing drum extending substantially horizontally and having a rectilinear profile internally presenting a generally smooth, continuous peripheral surface, material receiving means at one end wall of said drum including means defining an intake aperture, material output means at the other end wall of said drum including means defining a discharge aperture and a substantially horizontal mixing shaft extending through said drum and having a driving means, said shaft including stirring arms extending at different positions longitudinally of said shaft and radially therefrom into proximity of said peripheral surface operative to impart centrifugal force to material in said drum to form a ring of material circumferentially of the inner wall of said drum and at least one disk rotatable with said shaft and projecting therefrom into said ring of material during mixing operations and defining a passage between the circumference thereof and said peripheral surface, said intake and said discharge apertures being disposed within the confines of the circular area encompassed by said ring of material, said end walls being substantially ring shaped and thus retaining the main part of said material near the circumference of said drum, and a plurality of injection apertures arranged inside said drum and spaced from said intake aperture for supplying an additive agent such as a softener to the material in said drum, said injection apertures being in the form of nozzles mounted in the mantle of said drum and spaced axially from said disk, said nozzles being located inside said drum endwise of supply tubes extending through the ring of material into the open inner space.

5. Mixing machine for the continuous mixing of different materials, primarily powdered substances, comprising a mixing drum extending substantially horizontally and having a rectilinear profile internally presenting a generally smooth, continuous peripheral surface, material receiving means at one end wall of said drum including means defining an intake aperture, material output means at the other end wall of said drum including means defining a discharge aperture and a substantially horizontal mixing shaft extending through said drum and having a driving means, said shaft including stirring arms extending at different positions longitudinally of said shaft and radially therefrom into proximity of said peripheral surface operative to impart centrifugal force to material in said drum to form a ring of material circumferentially of the inner wall of said drum and at least one disk rotatable with said shaft and projecting therefrom into said ring of material during mixing operations and defining a passage between the circumference thereof and said peripheral surface, said intake and said discharge apertures being disposed within the confines of the circular area encompassed by said ring of material, said end walls being substantially ring shaped and thus retaining the main part of said material near the circumference of said drum, and a plurality of injection apertures arranged inside said drum and spaced from said intake aperture for supplying an additive agent such as a softener to the material in said drum, said injection apertures being provided in said shaft and spaced from said disk and said shaft having an axial bore in communication with said apertures to supply said additive agent thereto.

6. Mixing machine for the continuous mixing of different materials, primarily powdered substances, comprising a mixing drum extending substantially horizontally and having a rectilinear profile internally presenting a generally smooth, continuous peripheral surface, material receiving means at one end wall of said drum including means defining an intake aperture, material output means at the other end wall of said drum including means defining a discharge aperture and a substantially horizontal mixing shaft extending through said drum and having a driving means, said shaft including stirring arms extending at different positions longitudinally of said shaft and radially therefrom into proximity of said peripheral surface operative to impart centrifugal force to material in said drum to form a ring of material circumferentially of the inner wall of said drum and at least one disk rotatable with said shaft and projecting therefrom into said ring of material during mixing operations and defining a passage between the circumference thereof and said peripheral surface, said intake and said discharge apertures being disposed within the confines of the circular area encompassed by said ring of material, said end walls being substantially ring shaped and thus retaining the main part of said material near the circumference of said drum, and a plurality of injection apertures arranged inside said drum and spaced from said intake aperture for supplying an additive agent such as a softener to the material in said drum, said mixing drum having a mixing and heating zone at one end and having a drum section constituting a cooling zone unitary with said mixing and heating zone and in axial alignment therewith.

7. Mixing machine for the continuous mixing of different materials, primarily powdered substances, comprising a mixing drum extending substantially horizontally and having a rectilinear profile internally presenting a generally smooth, continuous peripheral surface, material receiving means at one end wall of said drum including means defining an intake aperture, material output means at the other end wall of said drum including means defining a discharge aperture and a substantially horizontal mixing shaft extending through said drum and having a driving means, said shaft including stirring arms extending at different positions longitudinally of said shaft and radially therefrom into proximity of said peripheral surface operative to impart centrifugal force to material in said drum to form a ring of material circumferentially of the inner wall of said drum and at least one disk rotatable with said shaft and projecting therefrom into said ring of material during mixing operations and defining a passage between the circumference thereof and said peripheral surface, said intake and said discharge apertures being disposed within the confines of the circular area encompassed by said ring of material, said end walls being substantially ring shaped and thus retaining the main part of said material near the circumference of said drum, and a plurality of injection apertures arranged inside said drum and spaced from said intake aperture for supplying an additive agent such as a softener to the material in said drum, said mixing drum having a mixing and heating zone at one end and having a drum section constituting a cooling zone unitary with said mixing and heating zone and in axial aligment therewith, said section constituting said cooling zone having a double mantle defining a passage for the flow of coolant, and said arms in the area of said cooling zone being formed to effect minimum friction to favor cooling of the material.

8. Mixing machine for the continuous mixing of different materials, primarily powdered substances, comprising a mixing drum extending substantially horizontally and having a rectilinear profile internally presenting a generally smooth, continuous peripheral surface, material receiving means at one end wall of said drum including means defining an intake aperture, material output means at the other end wall of said drum including means defining a discharge aperture and a substantially horizontal mixing shaft extending through said drum and having a driving means, said shaft including stirring arms extending at different positions longitudinally of said shaft and radially therefrom into proximity of said peripheral surface operative to impart centrifugal force to material in said drum to form a ring of material circumferentially of the inner wall of said drum and at least one disk rotatable with said shaft and projecting therefrom into said ring of material during mixing operations and defining a passage between the circumference thereof and said peripheral surface, said intake and said discharge apertures being disposed within the confines of the circular area encompassed by said ring of material, said end walls being substantially ring shaped and thus retaining the main part of said material near the circumference of said drum, and a plurality of injection apertures arranged inside said drum and spaced from said intake aperture for supplying an additive agent such as a softener to the material in said drum, said mixing drum having a mixing and heating zone at one end and having a drum section constituting a cooling zone unitary with said mixing and heating zone and in axial alignment therewith, said mixing shaft being divided into two sections proximate the entrance to said cooling zone each provided with separate drive means and said shaft section in said cooling zone being rotatable at a slower speed than the section in said zone for mixing and heating.

9. Mixing machine for the continuous mixing of different materials, primarily powdered substances, comprising a mixing drum extending substantially horizontally and having a rectilinear profile internally presenting a generally smooth, continuous peripheral surface, material receiving means at one end wall of said drum including means defining an intake aperture, material output means at the other end wall of said drum including means defining a discharge aperture and a substantially horizontal mixing shaft extending through said drum and having a driving means, said shaft including stirring arms extending at different positions longitudinally of said shaft and radially therefrom into proximity of said peripheral surface operative to impart centrifugal force to material in said drum to form a ring of material circumferentially of the inner wall of said drum and at least one disk rotatable with said shaft and projecting therefrom into said ring of material during mixing operations and defining a passage between the circumference thereof and said peripheral surface, said intake and said discharge apertures being disposed within the confines of the circular area encompassed by said ring of material, said end walls being substantially ring shaped and thus retaining the main part of said material near the circumference of said drum, and a plurality of injection apertures arranged inside said drum and spaced from said intake aperture for supplying an additive agent such as a softener to the material in said drum, said intake aperture and said discharge aperture being substantially circular and concentric with said mixing shaft and said intake aperture being smaller in cross-sectional area than said discharge aperture.

10. Mixing machine for the continuous mixing of different materials, primarily powdered substances, comprising a mixing drum extending substantially horizontally and having a rectilinear profile internally presenting a generally smooth, continuous peripheral surface, material receiving means at one end wall of said drum including means defining an intake aperture, material output means at the other end wall of said drum including means defining a discharge aperture and a substantially horizontal mixing shaft extending through said drum and having a driving means, said shaft including stirring arms extending at different positions longitudinally of said shaft and radially therefrom into proximity of said peripheral surface operative to impart centrifugal force to material in said drum to form a ring of material circumferentially of the inner wall of said drum and at least one disk rotatable with said shaft and projecting therefrom into said ring of material during mixing operations and defining a passage between the circumference thereof and said peripheral surface, said intake and said discharge apertures being disposed within the confines of the circular area encompassed by said ring of material, said end walls being substantially ring shaped and thus retaining the main part of said material near the circumference of said drum, said means defining said discharge aperture being removable for replacement by elements having different diameters, and being provided with adjustable segments or the like adjustable during operation for varying the cross-sectional area of the discharge aperture.

References Cited by the Examiner
UNITED STATES PATENTS

| | | | |
|---|---|---|---|
| 52,268 | 1/66 | Chapman | 259—25 |
| 122,870 | 1/72 | Vanatter | 259—105 |
| 228,319 | 6/80 | Cornwall et al. | 259—136 |
| 1,816,453 | 7/31 | Willard | 259—9 |
| 1,983,782 | 12/34 | Shropshire | 259—9 |
| 2,029,690 | 2/36 | Wilson | 259—9 X |
| 2,080,327 | 5/37 | McKinnis | 259—6 |
| 2,649,272 | 8/53 | Barbato | 251—212 |
| 2,721,359 | 10/55 | Morgan | 259—97 X |
| 2,746,730 | 5/56 | Swenson et al. | 259—9 |
| 2,791,404 | 5/57 | Kelley et al. | 259—9 |
| 2,836,401 | 5/58 | Phelan | 259—9 X |
| 2,894,733 | 7/59 | Wosmek | 259—97 X |
| 2,907,555 | 10/59 | Engels | 259—9 |
| 2,961,213 | 11/60 | Philippovic | 251—4 |

WALTER A. SCHEEL, *Primary Examiner.*

LEO QUACKENBUSH, *Examiner.*